United States Patent
Oh et al.

(10) Patent No.: US 9,556,542 B2
(45) Date of Patent: Jan. 31, 2017

(54) DEVICE FOR MANUFACTURING CARBON NANOTUBE FIBERS AND METHOD FOR MANUFACTURING CARBON NANOTUBE FIBERS USING SAME

(71) Applicant: LG CHEM, LTD., Seoul (KR)

(72) Inventors: Eugene Oh, Daejeon (KR); Dongchul Lee, Daejeon (KR); KwangWoo Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/421,393

(22) PCT Filed: May 29, 2014

(86) PCT No.: PCT/KR2014/004808
§ 371 (c)(1),
(2) Date: Feb. 12, 2015

(87) PCT Pub. No.: WO2014/204113
PCT Pub. Date: Dec. 24, 2014

(65) Prior Publication Data
US 2015/0240391 A1     Aug. 27, 2015

(30) Foreign Application Priority Data

Jun. 18, 2013 (KR) .................. 10-2013-0069342
Jun. 25, 2013 (KR) .................. 10-2013-0072769

(51) Int. Cl.
*C01B 31/02* (2006.01)
*D01F 9/133* (2006.01)
(Continued)

(52) U.S. Cl.
CPC ............. *D01F 11/16* (2013.01); *C01B 31/00* (2013.01); *C01B 31/024* (2013.01);
(Continued)

(58) Field of Classification Search
CPC .. C01B 31/00; C01B 31/0226; C01B 31/0233; C01B 31/024; D01F 9/133
See application file for complete search history.

(56) References Cited

U.S. PATENT DOCUMENTS 7,323,157 B2    1/2008   Kinloch et al.
7,824,649 B2    11/2010   Jiang et al.
(Continued)

FOREIGN PATENT DOCUMENTS

CN      1218002 A    6/1999
CN      1539731 A    10/2004
(Continued)

OTHER PUBLICATIONS

Zhang, Shanju et al., "Macroscopic Fibers of Well-Aligned Carbon Nanotubes by Wet Spinning", Small 2008, 4, No. 8, pp. 1217-1222.
(Continued)

*Primary Examiner* — Yogendra Gupta
*Assistant Examiner* — Joseph Leyson
(74) *Attorney, Agent, or Firm* — Dentons US LLP (57) ABSTRACT

Provided is an apparatus for producing a carbon nanotube fiber. The apparatus includes: a vertical reactor having a reaction zone; an inlet through which a spinning solution is introduced into the bottom of the reaction zone of the reactor; an inlet through which a carrier gas is introduced into the bottom of the reaction zone of the reactor; heating means for heating the reaction zone; and a discharge unit disposed on the top of the reaction zone and through which a carbon nanotube fiber is discharged from the reactor. The spinning solution entering the reaction zone through the spinning solution inlet is carbonized and graphitized while ascending from the bottom of the reaction zone by the carrier gas entering through the carrier gas inlet, to form a carbon nanotube fiber consisting of continuous aggregates of carbon (Continued)

nanotubes. Further provided is a carbon nanotube fiber produced using the apparatus. The carbon nanotube fiber is long and exhibits high electrical conductivity, tensile strength, and elasticity. Due to these advantages, the carbon nanotube fiber is expected to find a variety of applications, including multifunctional composite materials, deformation/damage sensors, transmission cables, and electrochemical devices, for example, microelectrode materials for biological substance detection, supercapacitors, and actuators.

13 Claims, 6 Drawing Sheets (51) Int. Cl.
*D01F 11/16* (2006.01)
*C01B 31/00* (2006.01)
(52) U.S. Cl.
CPC ...... *C01B 31/0226* (2013.01); *C01B 31/0233* (2013.01); *D01F 9/133* (2013.01); *C01B 2202/08* (2013.01); *C01P 2004/13* (2013.01)

(56) References Cited

U.S. PATENT DOCUMENTS

| 8,142,568 | B2 | 3/2012 | Jiang et al. |
| 2007/0051313 | A1 | 3/2007 | Wang et al. |
| 2010/0296983 | A1* | 11/2010 | Shiraki .................. B01J 4/002 422/198 |

FOREIGN PATENT DOCUMENTS

| CN | 1915805 | A | 2/2007 |
| CN | 101153413 | A | 4/2008 |
| CN | 101665997 | A | 3/2010 |
| CN | 103031624 | A | 4/2013 |
| CN | 103058167 | A | 4/2013 |
| JP | 3100962 | B2 | 10/2000 |
| JP | 2004-076195 | A | 3/2004 |
| JP | 2004-076196 | A | 3/2004 |
| JP | 2005-068000 | A | 3/2005 |
| JP | 2007-536434 | A | 12/2007 |
| JP | 2010-065339 | A | 3/2010 |
| JP | 2012-046841 | A | 3/2012 |
| JP | 2013-011039 | A | 1/2013 |
| KR | 10-2002-0009875 | A | 2/2002 |
| KR | 2002-0009875 | A | 2/2002 |
| KR | 10-2002-0026663 | A | 4/2002 |
| KR | 10-2009-0029955 | A | 3/2009 |
| KR | 10-2010-0052767 | A | 5/2010 |
| KR | 10-2010-0059412 | A | 6/2010 |
| KR | 10-2011-0080330 | A | 7/2011 |
| KR | 10-2012-0090383 | A | 8/2012 |
| WO | 2009-122139 | A1 | 10/2009 |
| WO | 2012/108607 | A1 | 8/2012 |

OTHER PUBLICATIONS

Jiang, Kaili et al., "Spinning continuous carbon nanotube yarns", Nature, vol. 419, Oct. 2002, p. 801.
Li, Ya-Li et al., "Direct Spinning of Carbon Nanotube Fibers from Chemical Vapor Deposition Synthesis", Science, vol. 304, Apr. 9, 2004, pp. 276-278.

* cited by examiner

DEVICE FOR MANUFACTURING CARBON NANOTUBE FIBERS AND METHOD FOR MANUFACTURING CARBON NANOTUBE FIBERS USING SAME

This application is a National Stage entry of International Application No. PCT/KR2014/004808 filed on May 29, 2014, which claims priority to Korean Patent Application Nos. 10-2013-0069342 filed on Jun. 18, 2013 and 10-2013-0072769 filed on Jun. 25, 2013, with the Korean Intellectual Property Office, all of which are incorporated herein in their entirety by reference.

BACKGROUND OF THE INVENTION

1. Field of the Invention

The present invention relates to an apparatus for producing a carbon nanotube fiber and a method for producing a carbon nanotube fiber using the apparatus.

2. Description of the Related Art

Carbon nanotubes (CNTs) are allotropes of carbon that have a diameter of several to tens of nanometers and a length of hundreds of micrometers to several millimeters. Since the synthesis of carbon nanotubes was first reported in Nature by Dr. Iijima in 1991, carbon nanotubes have been investigated in various fields due to their excellent thermal, electrical and physical properties and high length-to-diameter ratio. Such inherent characteristics of carbon nanotubes are attributed to the $sp^2$ bonding of carbon. Carbon nanotubes are stronger than steel and lighter than aluminum, and exhibit high electrical conductivity comparable to metals. Carbon nanotubes can be broadly classified into single-wall carbon nanotubes (SWNTs), double-wall carbon nanotubes (DWNTs), and multi-wall carbon nanotubes (MWNTs) depending on how many they have walls. Carbon nanotubes are divided into zigzag, armchair, and chiral conformations depending on their asymmetry/chirality.

Most of the studies to date have been directed towards the use of dispersions of carbon nanotubes in the form of powders as reinforcing agents of composite materials and the production of transparent conductive films using dispersions of carbon nanotubes. Carbon nanotubes have already reached commercialization in some applications. Dispersion of carbon nanotubes is important for the use of the carbon nanotubes in composite materials and transparent conductive films. However, high cohesive strength of carbon nanotubes due to their strong van der Waals force makes it not easy to disperse the carbon nanotubes at a high concentration while maintaining their dispersibility. Further, in composite materials using carbon nanotubes as reinforcing agents, the excellent characteristics of the carbon nanotubes are not sufficiently exhibited.

Under these circumstances, a great deal of research on the processing of carbon nanotubes into fibers has recently been conducted to produce carbon nanotube structures that sufficiently exhibit the characteristics of carbon nanotubes. Methods for processing carbon nanotubes into fibers can be classified into two methods: wet and dry methods.

An example of the wet methods is coagulation spinning. According to the coagulation spinning, when a dispersion containing carbon nanotubes and a dispersant is introduced into a polymer solution, the dispersant moves from the dispersion to the polymer solution and the polymer enters the dispersion to replace the dispersant, acting as a binder. The carbon nanotube fiber thus produced includes about 60% by weight of the carbon nanotubes. However, the physical properties of the carbon nanotube fiber are not satisfactory despite the significantly higher content of the carbon nanotubes than the content of carbon nanotubes in existing composite materials.

Another wet method for processing carbon nanotubes into fibers is liquid-crystalline spinning taking advantage of the ability of solutions of carbon nanotubes to form liquid crystals under specified conditions. This method is advantageous in that fibers of well-aligned carbon nanotubes can be produced, but has the disadvantages of very low spinning speed and strict conditions for the formation of liquid crystals of carbon nanotubes (S. Zhang, K. K. Koziol, I. A. Kinloch, A. H. Windle, "*Macroscopic Fibers of Well-Aligned Carbon Nanotubes by Wet Spinning*", Small 4, 1217 (2008)).

One of the dry methods for producing carbon nanotube fibers is brush spinning in which carbon nanotubes grown vertically on a silicon wafer are twisted and fiberized. However, the limited size of the silicon wafer causes many difficulties in large-scale production (K. Jiang, Q. Li, and S. Fan, "*Spinning continuous carbon nanotube yarns*", Nature 419, 801 (2002)).

Figure 1:
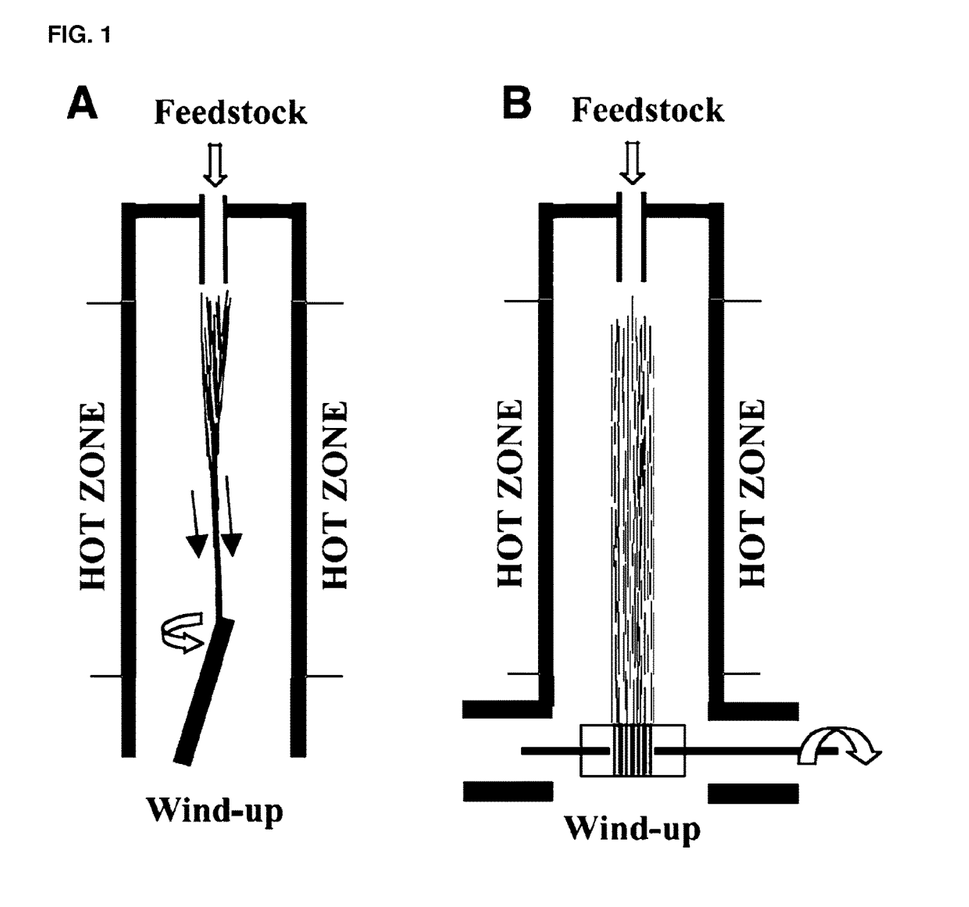
FIG. 1 schematically illustrates the constitutions of conventional apparatuses for producing carbon nanotube fibers by direct spinning.

Another dry method is direct spinning proposed by Professor Windle. As illustrated in FIG. 1, a carbon source and a catalyst, together with a carrier gas, are introduced into a vertically standing furnace through an inlet formed at the top of the furnace, carbon nanotubes are synthesized in the furnace, aggregates of the carbon nanotubes and the carrier gas descend to the bottom of the furnace, and the aggregates of the carbon nanotubes are wound up inside (see A in FIG. 1) or outside the furnace (see B in FIG. 1) to obtain a fiber. This method is advantageous over other methods in that carbon nanotube fibers can be mass produced at a spinning speed of a maximum of 20 to 30 m/min. However, the short retention time of the catalyst in the furnace makes it difficult to produce long, stable carbon nanotube fibers.

SUMMARY OF THE INVENTION

The present invention is intended to provide an apparatus for producing a long, high-strength carbon nanotube fiber in which a catalyst is allowed to stay in a furnace as long as possible, and a method for producing a carbon nanotube fiber using the apparatus.

One aspect of the present invention provides an apparatus for producing a carbon nanotube fiber, including: a vertical reactor having a reaction zone; an inlet through which a spinning solution is introduced into the bottom of the reaction zone of the reactor; an inlet through which a carrier gas is introduced into the bottom of the reaction zone of the reactor; heating means for heating the reaction zone; and a discharge unit disposed on the top of the reaction zone and through which a carbon nanotube fiber is discharged from the reactor, wherein the spinning solution entering the reaction zone through the spinning solution inlet is carbonized and graphitized while ascending from the bottom of the reaction zone by the carrier gas entering through the carrier gas inlet, to form a carbon nanotube fiber consisting of continuous aggregates of carbon nanotubes.

According to one embodiment of the present invention, the apparatus may further include a supply unit for supplying the spinning solution to the spinning solution inlet and a supply unit for supplying the carrier gas to the carrier gas inlet.

The spinning solution entering through the spinning solution inlet may be supplied to the reaction zone through a spray nozzle.

The spinning solution supply unit may include a mixing unit where a catalyst is dispersed in a liquid carbon compound to prepare the spinning solution and a transfer pump for supplying the spinning solution from the mixing unit to a supply nozzle.

The carrier gas entering through the carrier gas inlet may flow into the reaction zone at such a linear velocity that laminar flows can be formed.

The carrier gas supply unit may have flow control means by which the carrier gas entering through the carrier gas inlet is supplied at such a linear velocity that laminar flows can be formed.

The carrier gas entering through the carrier gas inlet may be supplied at a linear velocity corresponding to a Reynolds number (Re) of 1 or less, as calculated by Equation 1:

$$Re = \rho u D / \mu \qquad (1)$$

where $\rho$ is the density of the carrier gas (kg/m$^3$), u is the linear velocity of the carrier gas (m/s), D is the internal diameter of the reactor (m), and $\mu$ is the viscosity of the carrier gas (kg/m·s).

The carbon nanotube fiber discharge unit may have winding means for winding and collecting the carbon nanotube fiber discharged from the top of the reactor.

The carbon nanotube fiber discharge unit may have an inlet through which an inert gas is fed to form an inert gas curtain surrounding a continuous aggregate of the carbon nanotube fiber.

The winding means may be a spindle, reel, drum, or conveyor.

According to a further embodiment of the present invention, the apparatus may further include a distribution plate placed below the reaction zone of the reactor to divide the reactor into an upper reaction zone and a lower non-reaction zone in fluid communication with each other, and the spinning solution inlet and the carrier gas inlet may be disposed above and below the distribution plate, respectively.

According to another embodiment of the present invention, the apparatus may further include a distribution plate placed below the reaction zone of the reactor to divide the reactor into an upper reaction zone and a lower non-reaction zone in fluid communication with each other, and both the spinning solution inlet and the carrier gas inlet may be disposed below the distribution plate.

According to another embodiment of the present invention, the spinning solution entering the bottom of the distribution plate through the spinning solution inlet may be supplied to the reaction zone on the top of the distribution plate through a nozzle penetrating the distribution plate.

According to another embodiment of the present invention, the spinning solution entering through the spinning solution inlet and the carrier gas entering through the carrier gas inlet may be separated from each other under the distribution plate.

According to another embodiment of the present invention, the spinning solution entering through the spinning solution inlet and the carrier gas entering through the carrier gas inlet may be mixed with each other and supplied to the reaction zone through the distribution plate.

The heating means may be a furnace surrounding the reactor to heat the reaction zone to 1,000 to 3,000° C.

The spinning solution may be a dispersion of a catalyst in a liquid carbon compound. The carrier gas may flow through the carrier gas inlet at a rate of 0.5 to 50 cm/min.

The spinning solution may flow through the spinning solution inlet at a rate of 10 to 50 ml/min.

The spinning solution may further include a catalyst activator.

The spinning solution may contain 0.5 to 10% by weight of the catalyst, based on the weight of the carbon compound.

The catalyst may include at least one metal or oxide selected from the group consisting of iron, nickel, cobalt, platinum, ruthenium, molybdenum, vanadium, and oxides thereof.

The carbon compound may be selected from the group consisting of ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride, pentane, and mixtures thereof.

The carrier gas may be a hydrocarbon gas, an inert gas, a reducing gas, or a mixed gas thereof.

Specifically, the inert gas may be argon, nitrogen, or a mixed gas thereof and the reducing gas may be hydrogen, ammonia, or a mixed gas thereof, but are not limited thereto.

The present invention also provides a method for producing a carbon nanotube fiber using the apparatus.

The present invention also provides a carbon nanotube fiber produced using the apparatus.

According to the apparatus of the present invention, the spinning solution containing the catalyst dispersed therein is allowed to stay long in the hot zone of the reactor, enabling the production of a long, strong, highly elastic carbon nanotube fiber. Due to these advantages, the carbon nanotube fiber is expected to find a variety of applications, including reinforcing agents of multifunctional composite materials, deformation/damage sensors using stable and repetitive piezoresistance effects, transmission cables requiring high conductivity, and electrochemical devices, for example, microelectrode materials for biological substance detection, supercapacitors, and actuators, which require high specific surface area, excellent mechanical properties and high electrical conductivity.

DETAILED DESCRIPTION OF THE INVENTION

The present invention will now be described in more detail with reference to the accompanying drawings, in which embodiments of the invention are illustrated. However, it should be understood that the present invention is not limited to specific exemplary embodiments but includes all modifications, equivalents and substitutions included in the spirit and scope of the present invention.

Like reference numbers refer to like elements throughout the drawings.

It will be understood that, although the terms "first", "second", "A", "B", etc. may be used herein to describe various elements, these elements should not be limited by these terms. These terms are only used to distinguish one element from another element.

The term "and/or" encompasses both combinations of the plurality of related items disclosed and any item from among the plurality of related items disclosed.

When an element is mentioned to be "connected" to or "accessing" another element, this may mean that it is directly connected to or accessing the other element, but it is to be understood that another element may exist in-between.

An expression used in the singular encompasses the expression of the plural, unless it has a clearly different meaning in the context.

In the present application, it is to be understood that the terms such as "comprising", "including", "having," etc. are intended to indicate the existence of the features, numbers, operations, actions, elements, parts, or combinations thereof disclosed in the specification, and are not intended to preclude the possibility that one or more other features, numbers, operations, actions, elements, parts, or combinations thereof may exist or may be added.

The term "carbon nanotube fiber" used herein is intended to include all types of fibers prepared by growth or fusion of carbon nanotubes.

Solution spinning, array spinning, aerogel spinning, and film twisting/rolling are known as techniques for producing carbon nanotube fibers. The present invention is based on chemical deposition (CD) in which a carbon nanotube fiber or ribbon is directly spun from a carbon nanotube aerogel formed immediately after feeding of a spinning solution into a reactor.

Direct spinning is a process in which a catalyst is added to a carbon source, the resulting spinning solution, together with a carrier gas, is introduced at a constant rate into a vertical furnace to synthesize carbon nanotubes, and a carbon nanotube fiber consisting of the carbon nanotubes only is produced in a continuous manner.

According to a conventional method for producing a carbon nanotube fiber by direct spinning, a catalyst dispersion and a carrier gas introduced through the top of a furnace descend continuously along the furnace, and as a result, they do not stay long in a hot zone of the furnace.

Thus, the present invention provides an apparatus designed such that a catalyst dispersion and a carrier gas are introduced through the bottom of a furnace at constant rates to form upward laminar flows, which prevent the catalyst from continuously descending along the furnace and allow the catalyst to stay long in a hot zone of a reactor.

Hereinafter, the present invention will be described in more detail with reference to the accompanying drawings.

Figure 2:
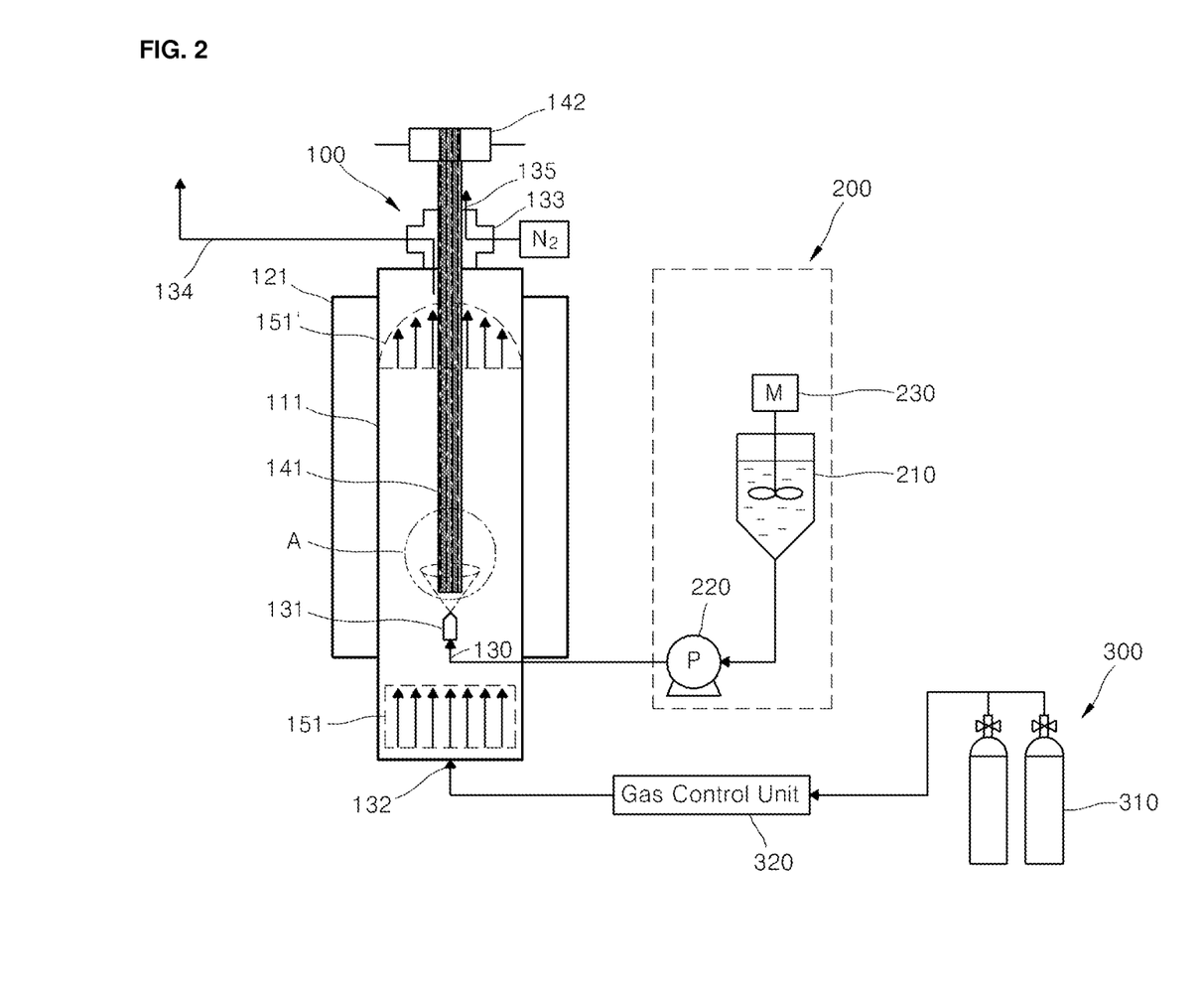
FIG. 2 illustrates an apparatus for producing a carbon nanotube fiber according to one embodiment of the present invention.
Figure 3:
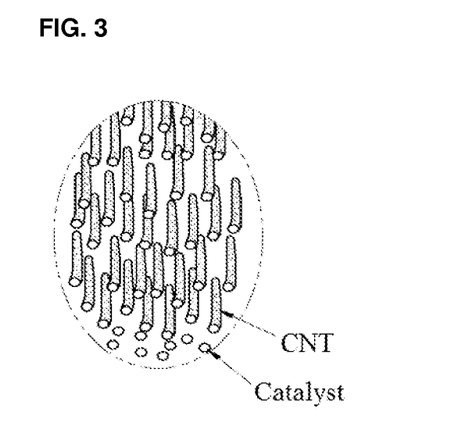
FIG. 3 is an enlarged diagram illustrating portion A of FIG. 2.

FIG. 2 illustrates an apparatus for producing a carbon nanotube fiber according to one embodiment of the present invention, and FIG. 3 is an enlarged diagram illustrating portion A of FIG. 2.

Specifically, the apparatus of the present invention includes: a vertical reactor 111 having a reaction zone; an inlet 130 through which a spinning solution is introduced into the bottom of the reaction zone of the reactor; an inlet 132 through which a carrier gas is introduced into the bottom of the reaction zone of the reactor; heating means 121 for heating the reaction zone; and a discharge unit 133 disposed on the top of the reaction zone and through which a carbon nanotube fiber is discharged from the reactor, wherein the spinning solution entering the reaction zone through the spinning solution inlet 130 is carbonized and graphitized while ascending from the bottom of the reaction zone by the carrier gas entering through the carrier gas inlet 132, to form a carbon nanotube fiber 141 consisting of continuous aggregates of carbon nanotubes.

The apparatus may further include a supply unit 200 for supplying the spinning solution to the spinning solution inlet 130 and a supply unit 300 for supplying the carrier gas to the carrier gas inlet 132.

The spinning solution flows into the reactor 111 from the spinning solution supply unit 200 through the spinning solution inlet 130 and is supplied to the reaction zone through a spray nozzle 131, as illustrated in FIG. 2, but the flow and supply of the spinning solution are not limited thereto.

The spinning solution supply unit 200 may include a mixing unit 210 where a catalyst is dispersed in a liquid carbon compound to prepare the spinning solution and a transfer pump 220 for supplying the spinning solution from the mixing unit 210 to a supply nozzle.

When the spinning solution is supplied to the reactor, it is preferred that laminar flows are formed by the carrier gas. Thus, it is preferable for the carrier gas entering through the carrier gas inlet 132 to flow into the reaction zone at such a linear velocity that laminar flows 151, 151' can be formed. As a result, carbon nanotubes are synthesized while the catalyst dispersed in the spinning solution flows upward, and they grow and are fused to form a carbon nanotube fiber, as illustrated in FIG. 3.

Preferably, the carrier gas entering the reactor 111 forms uniform laminar flows through the internal cross section of the reactor. To this end, a distribution plate may be used. Specific embodiments associated with the formation of laminar flows will be explained in more detail with reference to FIGS. 4 to 6.

The carrier gas flows into the reactor 111 from the carrier gas supply unit 300 including a gas tank 310 and flow control means 320 through the carrier gas inlet 132. By the flow control means 320, the carrier gas is supplied at such a linear velocity that laminar flows 151 can be formed.

Specifically, the carrier gas entering through the carrier gas inlet 132 is preferably supplied at a linear velocity corresponding to a Reynolds number (Re) of 1 or less, as calculated by Equation 1:

$$Re = \rho u D / \mu \qquad (1)$$

where $\rho$ is the density of the carrier gas (kg/m$^3$), u is the linear velocity of the carrier gas (m/s), D is the internal diameter of the reactor (m), and $\mu$ is the viscosity of the carrier gas (kg/m·s).

According to a conventional method for producing a carbon nanotube fiber by direct spinning, a carrier gas is fed from the top of a furnace and moves to the bottom of the furnace, and turbulent flows are formed by natural convection, causing difficulty in synthesizing carbon nanotubes in a stable and continuous manner. In contrast, according to the present invention, the flow rate of the carrier gas is lowered to prevent the spinning solution containing the catalyst dispersed therein from ascending to the top of the furnace and to form laminar flows in the hot zone of the reactor, thus allowing the catalyst to stay longer in the hot zone of the furnace. Proper control over the feeding rates of the carrier gas and the spinning solution is important for the formation of laminar flows in the hot zone of the reactor.

The flow rate range of the carrier gas for laminar flow formation and the floatability of the catalyst particles will be discussed, assuming that the carrier gas is hydrogen.

Reactor diameter (D): 0.1 m
Reaction temperature: 1273 K

Carrier gas: $H_2$

Catalyst particles: Fe particles (which are formed from ferrocene included in the spinning solution and are assumed to be distributed with an average diameter of 5 nm)

Calculation of Flow Rate Range for Laminar Flow Formation $H_2$ density ($\rho_{H2}$): 0.0096 kg/m$^3$ (at 1273 K)

$H_2$ viscosity ($\mu_{H2}$): 2.15×10$^{-5}$ kg/m·s (at 1273 K)

In order for the gas to form laminar flows in the reactor, the Reynolds number (Re) should be less than 1.

$$Re=\rho uD/\mu=0.0096 \text{ kg/m}^3 \cdot u \cdot (0.1 \text{ m})/2.15\times10^{-5} \text{ kg/m·s}$$

For Re<1, u should be less than 0.0223 m/s (=2.23 cm/s).

That is, the flow rate of the carrier gas should be 2.23 cm/s or less when the diameter of the reactor is 0.1 m, the reaction temperature is 1000° C., and the carrier gas is hydrogen.

The lower limit of the flow rate of the carrier gas is considered a level at which the catalyst particles are not allowed to flow. It is arithmetically impossible for the catalyst particles to flow at a linear velocity of about 10$^{-14}$ cm/s, but about 1 mm/s can be considered the practical lower limit of the flow rate. In this example, when nitrogen is used as the carrier gas instead of hydrogen, laminar flows are formed at 1.72 mm/s or less.

Floatability of Catalyst Particles

When assuming that the catalyst particle formed in the reactor is 5 nm in diameter, the floating state of the catalyst particle can be predicted by comparison of the drag force and gravity force of the catalyst particle. According to Stokes' law, the drag force is defined by Equation 2:

$$\text{Drag force}=6\pi\eta rv \quad (2)$$

where $\eta$ is the viscosity of the fluid, r is the radius of the particle, and v is the flow rate of the gas.

$$\text{Gravity force}=mg \quad (3)$$

where m is the mass of the particle and g is the acceleration of gravity.

Substitution of the values into the above equations yields $$F_{drag}=6\pi(2.15\times10^{-5} \text{ kg/m·s})(2.5\times10^{-9} \text{ m})(0.0223 \text{ m/s})=2.26\times10^{-14} \text{ N}$$

$$F_{gravity}=mg=(\text{volume of the catalyst particles})\times(\text{density of catalyst particles})\times g=(6.54\times10^{-26} \text{ m}^3)\times(7.874 \text{ kg/m}^3)\times9.8 \text{ m/s}^2=5.05\times10^{-24} \text{ N}$$

At $F_{drag}>F_{gravity}$, the catalyst particle is floatable. The equations show that when the carrier gas is hydrogen and the linear velocity is not greater than 2.23 cm/s, the catalyst particle is floatable.

Figure 4:
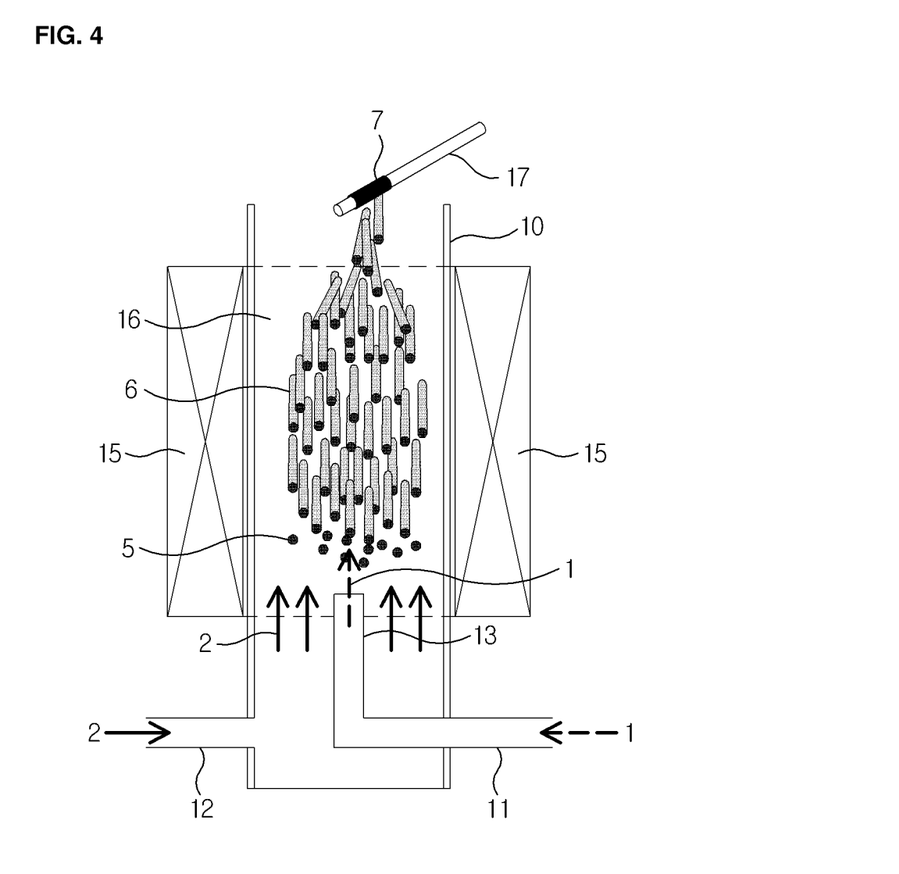
FIGS. 4 to 6 schematically illustrate apparatuses for producing carbon nanotube fibers according to further embodiments of the present invention.
Figure 5:
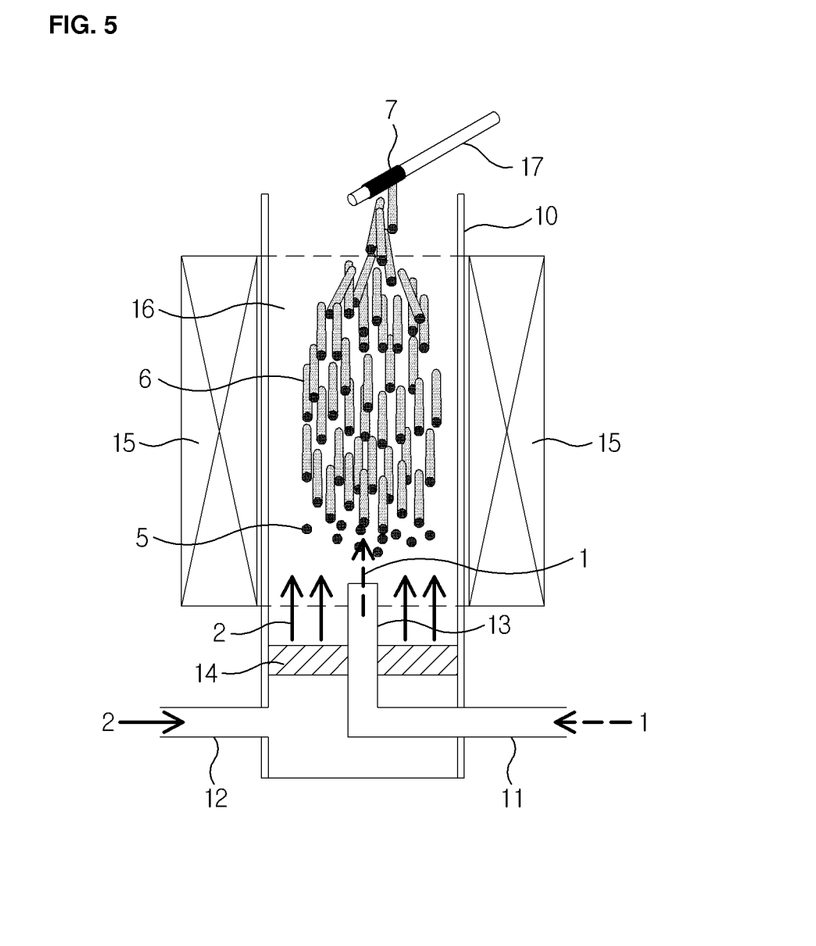
Figure 6:
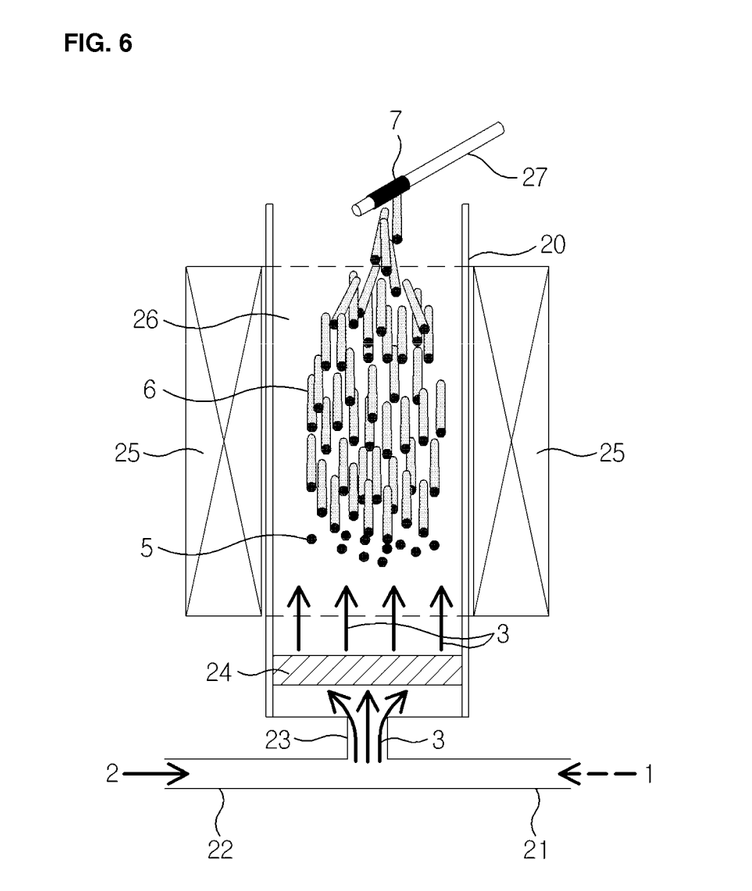

FIGS. 4 to 6 schematically illustrate apparatuses for producing carbon nanotube fibers according to various embodiments of the present invention.

Specifically, each of the apparatuses includes: a vertical reactor 10 or 20 having a reaction zone 16 or 26; an inlet 11 through which a spinning solution 1 is introduced into the bottom of the reaction zone 16 or 26 of the reactor; an inlet 12 through which a carrier gas 2 is introduced into the bottom of the reaction zone 16 or 26 of the reactor; heating means 15 or 25 for heating the reaction zone 16 or 26; and winding means 17 or 27 for winding continuous aggregates 7 of carbon nanotubes 6 on the top of the reaction zone 16 or 26 to produce a carbon nanotube fiber, wherein the continuous aggregates 7 of carbon nanotubes 6 are formed in the reaction zone 16 or 26 as a result of the reaction of the spinning solution 1 supplied from the bottom while the carrier gas 2 forms laminar flows and the spinning solution 1 ascends.

According to the embodiment illustrated in FIG. 4, the spinning solution 1 entering the spinning solution inlet 11 may be supplied to the reaction zone through a nozzle 13.

According to the embodiments illustrated in FIGS. 5 and 6, each of the apparatuses may further include a distribution plate 14 or 24 placed below the reaction zone 16 or 26 of the reactor to divide the reactor into an upper reaction zone and a lower non-reaction zone in fluid communication with each other, and the spinning solution inlet 11 and the carrier gas inlet 12 may be disposed above and below the distribution plate 14 or 24, respectively.

The distribution plate 14 or 24 is not essential but optional in the apparatuses. A flow of a gas or gas-liquid mixture can pass through the distribution plate 14 or 24 and the two zones are in communication with each other. Preferably, the distribution plate 14 or 24 has a porosity sufficient to prevent the reactant, the catalyst or the carbon nanotubes from flowing reversely from the top therethrough. Specifically, the distribution plate may be selected from metal foams, perforated plates, nozzles, sieves, and bubble caps. The distribution plate may have a uniform opening ratio over the entire area thereof. Alternatively, the distribution plate may be designed to have partially different opening ratios such that laminar flows are formed advantageously.

According to the embodiment illustrated in FIG. 5, the spinning solution 1 entering the bottom of the distribution plate 14 through the spinning solution inlet 11 may be supplied to the reaction zone 16 on the top of the distribution plate 14 through a nozzle 13 penetrating the distribution plate 14.

In this embodiment, the spinning solution 1 entering through the spinning solution inlet 11 and the carrier gas 2 entering through the carrier gas inlet 12 may be separated from each other under the distribution plate 14. That is, the spinning solution 1 may be directly supplied to the reaction zone 16 through the nozzle 13 connected to the inlet 11, and the carrier gas 2 may enter a space under the distribution plate 14 and be supplied to the reaction zone 16 through the distribution plate 14. The carrier gas 2 is preferably supplied at a uniform linear velocity over the entire cross section of the reaction zone and meets the spinning solution 1 supplied through the nozzle 13 to form laminar flows.

According to the embodiment illustrated in FIG. 6, the spinning solution 1 and the carrier gas 2 may be mixed under the distribution plate 24 and supplied to the reaction zone 26. Specifically, the spinning solution 1 introduced through the spinning solution inlet 21 by suitable feeding means (not illustrated) may be homogeneously mixed with the carrier gas introduced through the carrier gas inlet 22 to form mixed flows 3, and the mixed flows 3 may be sequentially supplied to a space under the distribution plate 24 through a line 23 and the reaction zone 26 through the distribution plate 24.

The heating means 15, 25 or 121 may be a furnace surrounding the reactor to heat the reaction zone 16 or 26 to 1,000 to 3,000° C. By the heating means, the hot zone 16 or 26 is preferably maintained at a temperature of 1,000 to 2,000° C., 1,000 to 1,500° C., or 1,000 to 1300° C., more preferably 1,100 to 1,200° C. The temperature of the hot zone of the reactor affects the diffusion rate of carbon into the catalyst to control the growth rate of carbon nanotubes. When carbon nanotubes are synthesized by chemical deposition, the growth rate of carbon nanotubes generally increases with increasing synthesis temperature, achieving improved crystallinity and strength.

The carrier gas 2 may be introduced into the bottom of the reaction zone 16 or 26 of the reactor 10, 20 or 111 at a linear velocity of 0.5 to 50 cm/min, preferably 0.5 to 40 cm/min, 0.5 to 30 cm/min, 0.5 to 20 cm/min, or 1 to 10 cm/min. The linear velocity of the carrier gas may vary depending on various factors, such as the kind of the carrier gas, the size of the reactor, and the kind of the catalyst, as discussed previously.

The carrier gas 2 dilutes the spinning solution 1 to control the amount of the spinning solution 1 introduced into the reaction zone 16 or 26 for the synthesis of carbon nanotubes. The carrier gas serves to release unreacted amorphous carbon and excess impurities, resulting in an improvement in the purity of a carbon nanotube fiber 7 as the final product. The carrier gas 2 may be a hydrocarbon gas, an inert gas, a reducing gas, or a mixed gas thereof.

The inert gas may be, for example, argon (Ar) or nitrogen (N2) gas and the reducing gas may be, for example, hydrogen ($H_2$) or ammonia ($NH_3$) gas, but are not limited thereto.

The spinning solution 1 may be spun into the hot zone 16 or 26 at a rate of 10 to 50 ml/min, preferably 10 to 40 ml/min, 10 to 30 ml/min or 10 to 20 ml/min.

During continuous feeding of the spinning solution 1, carbon nanotubes 6 or 141 are synthesized in the reaction zone 16 or 26 and form continuous spherical aggregates while ascending to the center of the top of the furnace. The aggregates are collected, drawn out from the hot zone, and wound around the winding means 17, 27 or 142 to obtain a carbon nanotube fiber.

The winding means 17, 27 or 142 may be any suitable means that can stably wind the carbon nanotube fiber discharged from the hot zone. For example, the winding means 17, 27 or 142 may be a spindle, reel, drum, or conveyor.

The winding temperature and speed affect the alignment of the carbon nanotubes in the direction of the fiber axis to determine the thermal, electrical, and physical properties of the carbon nanotube fiber. Preferably, the carbon nanotubes are wound at a speed ranging from 5 to 50 rpm at a temperature of 15 to 120° C.

As illustrated in FIG. 2, the carbon nanotube fiber discharge unit 133 may have an inlet through which an inert gas is fed to form an inert gas curtain 135 surrounding a continuous aggregate of the carbon nanotube fiber.

The discharge unit 133 may have an outlet through which the carbon nanotube fiber is discharged and an exhaust gas line 134 through which the carrier gas is released.

The spinning solution 1 may contain 0.5 to 10% by weight, 1 to 5% by weight, or 1.5 to 4% by weight of the catalyst, based on the weight of the liquid carbon compound as a carbon source. The excess catalyst acts as an impurity, which makes it difficult to produce the carbon nanotube fiber 7 in high yield and may be a cause of poor thermal, electrical, and physical properties of the carbon nanotube fiber.

The spinning solution 1 may further include a catalyst activator.

Generally, carbon is diffused into the catalyst in a molten state and is then deposited to synthesize the carbon nanotubes 6. The catalyst activator is used as a promoter that increases the diffusion rate of carbon to allow the synthesis of the carbon nanotubes 6 in a short time. As the catalyst activator, there may be used, for example, thiophene ($C_4H_4S$). Thiophene lowers the melting point of the catalyst and removes amorphous carbon, enabling the synthesis of the carbon nanotubes 6 in high yield at low temperature. The content of the catalyst activator may also affect the structure of the carbon nanotubes 6. For example, a multi-wall carbon nanotube fiber may be produced when 1 to 5% by weight of thiophene is mixed with ethanol, and a single-wall carbon nanotube fiber may be produced when 0.5% by weight or less of thiophene is mixed with ethanol.

In the present invention, the carbon compound as a carbon source is diffused into the catalyst to synthesize the carbon nanotubes and is selected taking into consideration the desired molecular weight distribution, concentration, viscosity, surface tension, and dielectric constant of the carbon nanotubes, and the characteristics of a solvent used. The liquid carbon compound may be selected from the group consisting of ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride, and pentane. The liquid carbon compound is preferably ethanol ($C_2H_5OH$), xylene ($C_8H_{10}$), diethyl ether [$(C_2H_5)_2O$], polyethylene glycol [$—(CH_2—CH_2—O)_9$], 1-propanol ($CH_3CH_2CH_2OH$), acetone ($CH_3OCH_3$), ethyl formate ($CH_3CH_2COOH$), benzene ($C_6H_6$), hexane ($C_6H_{14}$), or mesitylene [$C_6H_3(CH_3)_3$].

The catalyst may include at least one metal or oxide selected from the group consisting of, but not limited to, iron, nickel, cobalt, platinum, ruthenium, molybdenum, vanadium, and oxides thereof. The catalyst may be in the form of nanoparticles. The catalyst is preferably a metallocene containing iron, nickel or cobalt. For example, the catalyst is ferrocene.

The present invention also provides a method for producing a carbon nanotube fiber using the apparatus. Specifically, the method of the present invention includes (a) preparing a spinning solution containing a catalyst dispersed in a liquid carbon compound, (b) preparing a carrier gas, (c) introducing the spinning solution and the carrier gas into the bottom of a reactor having a hot zone and upwardly spinning the spinning solution in the hot zone where the spinning solution is allowed to react while moving upward by the carrier gas to form continuous aggregates of carbon nanotubes, and (d) winding the continuous aggregates of carbon nanotubes on the top of the reactor to produce a carbon nanotube fiber.

The present invention also provides a carbon nanotube fiber produced using the apparatus.

The apparatus is designed such that the catalyst stays long in the reactor. Due to this design, the diameter of the carbon nanotube fiber can increase to 100 nm to 100 μm. In addition, the continuous aggregation of carbon nanotubes is expected to increase the length of the carbon nanotube fiber to tens of micrometers to several centimeters. The carbon nanotube fiber is expected to have excellent mechanical properties, for example, high strength, tensile strength and elasticity, high electrical conductivity, and increased specific surface area due to its length as large as several centimeters.

It will be understood by those skilled in the art that the invention can be implemented in other specific forms without changing the spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

EXPLANATION OF REFERENCE NUMERALS

100 Reaction unit
111 Reactor

121 Heater
131 Spinning solution spray nozzle
132 Gas inlet
133 Gas and carbon nanotube fiber discharge unit
134 Exhaust gas line
135 Nitrogen gas curtain
141 Carbon nanotube fiber
142 Carbon nanotube fiber winding means
151, 151' Laminar flows
200 Spinning solution supply unit
210 Mixing unit
220 Transfer pump
230 Mixer
300 Carrier gas supply unit
310 Gas tank
320 Gas control unit
10, 20 Reactors
11, 21 Spinning solution inlets
12, 22 Carrier gas inlets
13 Spinning solution supply nozzle
23 Mixed flow line
14, 24 Distribution plates
15, 25 Furnaces
16, 26 Hot zones
17, 27 Winding means
1 Spinning solution
2 Carrier gas
3 Mixed flow
5 Catalyst particles
6 Carbon nanotubes
7 Carbon nanotube fiber According to the apparatus of the present invention, the spinning solution containing the catalyst dispersed therein is allowed to stay long in the hot zone of the reactor, enabling the production of a long, strong, highly elastic carbon nanotube fiber. Due to these advantages, the carbon nanotube fiber is expected to find a variety of applications, including reinforcing agents of multifunctional composite materials, deformation/damage sensors using stable and repetitive piezoresistance effects, transmission cables requiring high conductivity, and electrochemical devices, for example, microelectrode materials for biological substance detection, supercapacitors, and actuators, which require high specific surface area, excellent mechanical properties and high electrical conductivity.

What is claimed is:

1. An apparatus for producing a carbon nanotube fiber, comprising:
    a vertical reactor having a reaction zone;
    a spinning solution inlet through which a spinning solution is introduced into the bottom of the reaction zone of the reactor;
    a carrier gas inlet through which a carrier gas is introduced into the bottom of the reaction zone of the reactor;
    a heater that heats the reaction zone;
    a discharge unit disposed on the top of the reaction zone and through which a carbon nanotube fiber is discharged from the reactor; and
    a distribution plate placed below the reaction zone of the reactor to divide the reactor into an upper reaction zone and a lower non-reaction zone in fluid communication with each other, and the spinning solution inlet and the carrier gas inlet are disposed above and below the distribution plate, respectively,
    wherein the spinning solution entering the reaction zone through the spinning solution inlet is carbonized and graphitized while ascending from the bottom of the reaction zone by the carrier gas entering through the carrier gas inlet, to form a carbon nanotube fiber consisting of continuous aggregates of carbon nanotubes, and
    wherein the carbon nanotube fiber discharge unit has a winder that winds and collects the carbon nanotube fiber discharged from the top of the reactor.

2. The apparatus according to claim 1, further comprising a supply unit for supplying the spinning solution to the spinning solution inlet and a supply unit for supplying the carrier gas to the carrier gas inlet.

3. The apparatus according to claim 1, wherein the spinning solution entering through the spinning solution inlet is supplied to the reaction zone through a spray nozzle.

4. The apparatus according to claim 2, wherein the spinning solution supply unit comprises a mixing unit where a catalyst is dispersed in a liquid carbon compound to prepare the spinning solution and a transfer pump for supplying the spinning solution from the mixing unit to a supply nozzle.

5. The apparatus according to claim 2, wherein the carrier gas supply unit comprises a gas control unit by which the carrier gas entering through the carrier gas inlet is supplied at such a linear velocity that laminar flows are formed.

6. The apparatus according to claim 1, wherein the carbon nanotube fiber discharge unit has an inlet through which an inert gas is fed to form an inert gas curtain surrounding a continuous aggregate of the carbon nanotube fiber.

7. The apparatus according to claim 1, wherein the winder is a spindle, reel, drum, or conveyor.

8. The apparatus according to claim 1, wherein the spinning solution entering the bottom of the distribution plate through the spinning solution inlet is supplied to the reaction zone on the top of the distribution plate through a nozzle penetrating the distribution plate.

9. The apparatus according to claim 1, wherein the spinning solution entering through the spinning solution inlet and the carrier gas entering through the carrier gas inlet are separated from each other under the distribution plate.

10. The apparatus according to claim 1, wherein the heater is a furnace surrounding the reactor to heat the reaction zone to 1,000 to 3,000° C.

11. A method for producing a carbon nanotube fiber comprising providing the apparatus according to claim 1, and spinning the spinning solution in the vertical reactor to produce the carbon nanotube fiber.

12. An apparatus for producing a carbon nanotube fiber, comprising:
    a vertical reactor having a reaction zone;
    a spinning solution inlet through which a spinning solution is introduced into the bottom of the reaction zone of the reactor;
    a carrier gas inlet through which a carrier gas is introduced into the bottom of the reaction zone of the reactor;
    a heater that heats the reaction zone;
    a discharge unit disposed on the top of the reaction zone and through which a carbon nanotube fiber is discharged from the reactor; and
    a distribution plate placed below the reaction zone of the reactor to divide the reactor into an upper reaction zone and a lower non-reaction zone in fluid communication with each other, and both the spinning solution inlet and the carrier gas inlet are disposed below the distribution plate, wherein the spinning solution entering the reaction zone through the spinning solution inlet is carbonized and graphitized while ascending from the bottom of the reaction zone by the carrier gas entering through the carrier gas inlet, to form a carbon nanotube fiber consisting of continuous aggregates of carbon nanotubes, and wherein the carbon nanotube fiber discharge unit has a winder that winds and collects the carbon nanotube fiber discharged from the top of the reactor.

13. The apparatus according to claim 12, wherein the spinning solution entering through the spinning solution inlet and the carrier gas entering through the carrier gas inlet are mixed with each other and supplied to the reaction zone through the distribution plate.

\* \* \* \* \*